Patented Mar. 3, 1942

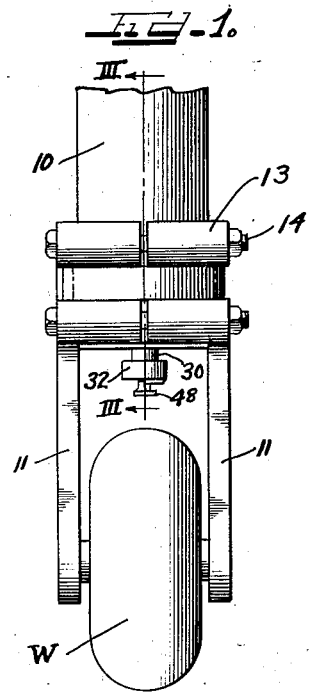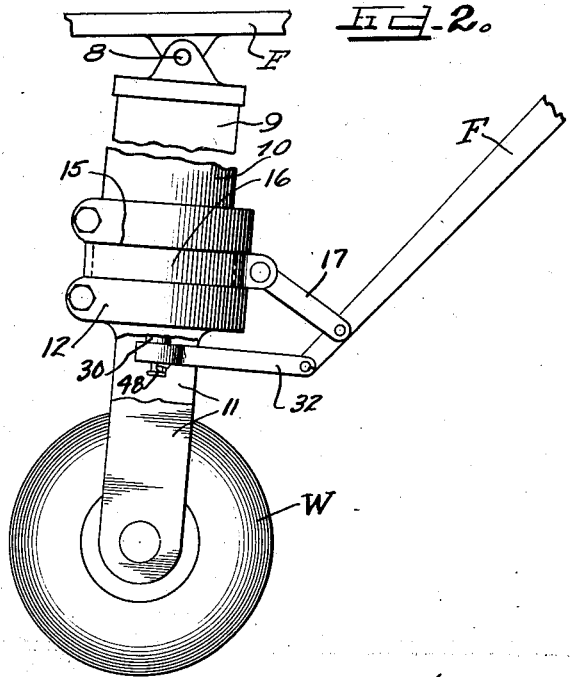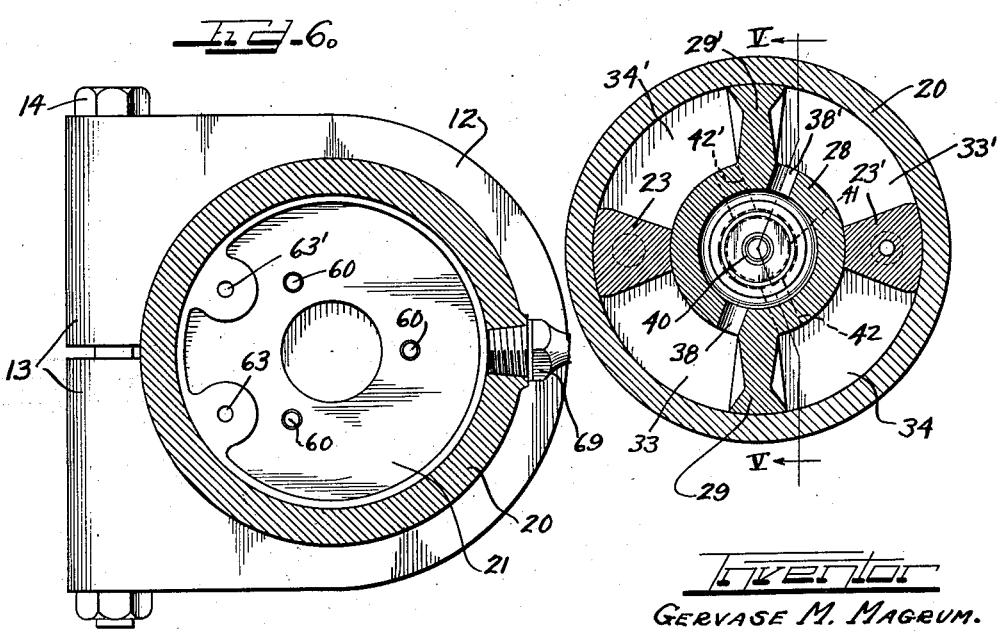

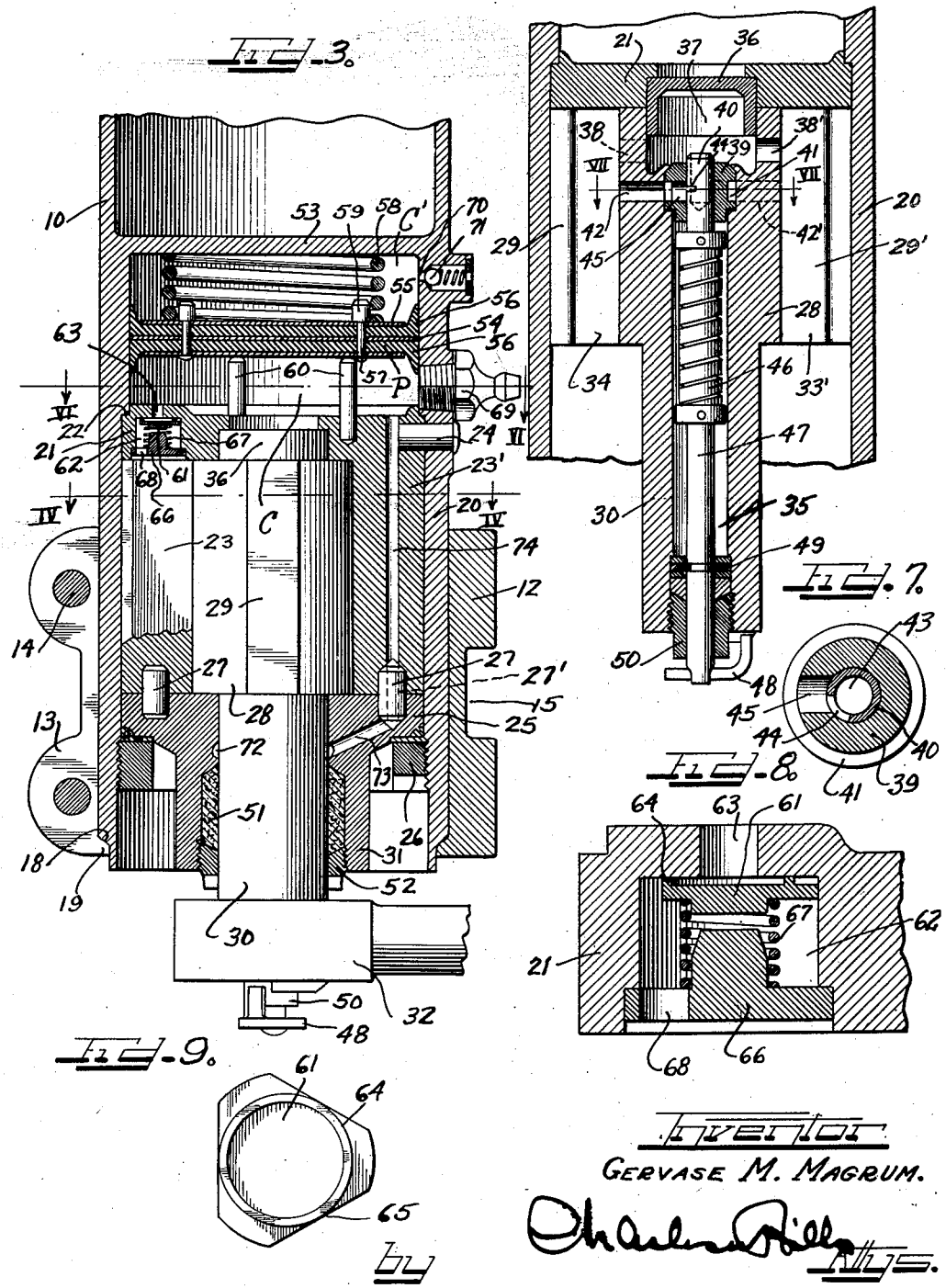

2,275,371

UNITED STATES PATENT OFFICE 2,275,371

SHOCK ABSORBING STRUCTURE FOR AIRPLANE LANDING GEARS

Gervase M. Magrum, Buffalo, N. Y., assignor to Houde Engineering Corporation, Buffalo, N. Y., a corporation of New York Application June 10, 1938, Serial No. 212,867

7 Claims. (Cl. 244—100)

This invention relates to hydraulic shock absorber structure adapted particularly for use in connection with the landing gear of airplanes.

In certain types of airplane landing gears, especially where a single front wheel functions as a caster, shimmy or wobble of this wheel cannot be tolerated, as it might seriously interfere with efficient and safe landing. It is therefore the object of this invention to provide improved hydraulic shock absorber structure which will not interfere with the free caster movement of the single front wheel of a landing gear but will function efficiently to check any shimmy or wobble of the wheel so that smooth and proper operation thereof is assured.

I preferably employ a hydraulic shock absorber of the rotary type comprising a cylinder structure and a wing piston structure and with means controlling the flow of displaced hydraulic fluid.

In the usual construction of a landing gear, the bearing fork for the caster wheel is secured to or extends from a tubular strut which is rotatably mounted on the landing gear framework for caster movement of the wheel. Such arrangement is disclosed in patents such as Saulnier 2,105,374, January 11, 1938, or in Ronan Patent 1,937,596, December 5, 1933, or Ayer Patent 2,110,543, March 8, 1938. With such structure, the end of the tubular strut may be adapted to function as the cylinder part of the hydraulic shock absorber structure, and such adaptation constitutes one of the important features of my invention. With such arrangement, the shock absorber structure cylinder becomes part of the rotating caster structure, and the piston element for the shock absorber structure will be anchored to the landing gear framework, so that by turning of the cylinder structure with the wheel the hydraulic fluid will be displaced but its flow will be suitably metered and controlled so that the wheel may properly function but any shimmy or wobble thereof will be checked.

Landing gears are usually arranged so that after landing they may be drawn up against or into the body of the airplane in which position the axis of the shock absorber structure might assume a horizontal of inverted position, and it is therefore another important object of the invention to provide means for preventing the hydraulic fluid from leaving the hydraulic working chambers and to keep these chambers at all times filled with the fluid.

The various features of the invention are shown incorporated in the structure disclosed on the drawings, in which drawings:

Figure 1 is a front elevation of the lower end of the landing gear which supports the front wheel;

Figure 2 is a side elevation of the structure shown in Figure 1;

Figure 3 is an enlarged section on plane III—III of Figure 1;

Figure 4 is a section on plane IV—IV of Figure 3;

Figure 5 is a section on plane V—V of Figure 4;

Figure 6 is a section on plane VI—VI of Figure 3;

Figure 7 is an enlarged section on plane VII—VII of Figure 5;

Figure 8 is an enlarged sectional view of the replenishing valve structure; and

Figure 9 is a plan view of the valve plate.

Referring to Figures 1 and 2, the reference numeral 10 represents a tubular strut which extends from the landing gear framework F on which it is rotatably mounted in any suitable manner, for example, as disclosed in the patents hereinbefore referred to. Fork arms 11 extend downwardly from the lower end of the strut and between which the wheel W is journalled. The fork arms 11 may be integral with the strut 10 or, as shown, they may extend from a collar 12 having clamping lugs 13 for receiving bolts 14 so that the collar may be rigidly clamped to the strut. The collar 12 is shown provided with a circumferentially extending channel 15 receiving a strap 16 connected by a link 17 forming part of the framework F of the landing gear, the strap supporting the lower end of the strut and guiding its rotary movement with the wheel. As shown by Figure 3, the strut at its lower end may be of reduced diameter to provide an abutment shoulder 18 engaged by the flange 19 at the lower end of the collar 12 so that the bumps of the wheel on the ground will be in greater part communicated directly to the strut 10 and axial displacement of the collar 12 on the strut prevented.

It should be noted that the rotatable tubular strut 10, as is conventional practice (see prior Patents Nos. 2,110,543 and 1,937,596), comprises one telescoping member of an oleo strut or shock absorber, the other cooperating and non-rotatable telescoping tubular member 9 being cupped at its upper end and pivotally attached at 8 to a cross member of the landing gear framework F.

As shown on Figure 3, the outer end portion of the strut 10 may form the cylinder wall 20 for the hydraulic shock absorber structure. The inner cross wall 21 within the cylinder wall 20 seats against a shoulder 22 provided within the wall 20, and from the cross wall diametrically opposite hydraulic abutments or partition walls 23 and 23' extend forwardly, and, as shown, these abutment walls may be integral with the cross wall 21. One or more pins 24 may be extended through the wall 20 into the wall 21 for locking the walls together.

The outer cross wall 25 fits into the cylinder wall 20 and abuts the outer ends of the partition walls 23 and 23', and a clamping ring 26 having threaded engagement with the wall 20 securely clamps the outer wall 25 against the partition walls and holds the inner wall 21 against its seat 22. Pins 27 will lock the outer wall 25 against rotary displacement relative to the partition walls 23 and 23'.

The walls 20, 21, and 25 define a cylinder space for the hydraulic working fluid into which space the partition walls 23 and 23' project radially. Within the cylinder space is the cylindrical hub 28 of the piston structure, the hub bearing against the inner faces of the partition walls and having oppositely extending piston vanes 29 and 29' thereon which engage with the cylindrical inner surface of the wall 20 between the partition walls. The piston shaft 30 extends from the hub 28 through the outer wall 25 and the bearing extension 31 thereon, the outer end of the shaft having secured thereto a link 32 so connected to the landing gear framework F that the piston structure will be held against rotation with the caster wheel supporting strut.

From the foregoing, it is apparent that the piston shaft 30 is held against rotation by the above described torque resisting connection to the framework F, to which framework, as is conventional practice, the upper member 8 of the oleo strut is also fastened.

The piston hub with its vanes and the partitions 23 and 23' divides the cylinder space into the diagonally opposite hydraulic working chambers 33 and 33', and the diagonally opposite working chambers 34 and 34'. The piston shaft and its hub have the bore 35 extending therethrough, the inner end of which is enlarged to receive the bearing plug 36 seated in the wall 21, the plug being hollow and with the enlarged bore end forming a chamber 37 which communicates with the working chambers 33 and 33' through the passages 38 and 38' respectively extending through the piston hub.

Adjacent to the chamber 37, a seat bushing 39 is secured in the bore 35, the bushing being bored to receive the cylindrical valve plug 40. The seat bushing has the circumferential channel 41 communicating with the working chambers 34 and 34' through passageways 42 and 42' in piston hub.

At its inner end the valve plug 40 has the passageway or bore 43 therethrough communicating with the chamber 37, and the valve plug has the circumferentially extending orifice slit 44 communicating with the passageway 45 between the seat bushing channel 41 and the bushing bore in which the valve plug seats, the circumferential extent of overlap of the passageway 45 by the orifice slit 44 determining the resistance to the fluid flow between the shock absorbing hydraulic chambers. When the cylinder structure from which the wheel W extends is rotated in one direction relative to the piston structure, the displaced fluid will flow from the working chambers 33 and 33' through the ports 38 and 38' into the chamber 37 and then through the valve plug bore and the exposed part of the orifice slit 44 into the passageway 45 and the channel 41 in the seat bushing and from there through the ports 42 and 42' into the working chambers 34 and 34'. Upon rotation of the cylinder structure in the opposite direction, the flow of the displaced fluid will be in reverse direction through the path just traced, the resistance to such flow and therefore the hydraulic control of the rotation of the wheel supporting structure being determined by the size of the orifice passageway presented by the orifice slit 44.

I have shown a thermostat coil 46 secured at its inner end to the valve plug and at its outer end to the stem 47 which extends through the piston shaft bore to the exterior thereof and there provided with a lever 48 whereby the stem structure may be manually adjusted for the desired degree of exposure of the orifice slit and the desired shock absorbing resistance. After manual setting of the valve, the thermostat coil will respond to temperature change within the shock absorber structure so that the orifice exposure will be thermostatically adjusted to compensate for change in viscosity of the hydraulic fluid due to temperature change.

As shown, suitable guide washer or collar structure 49 is clamped in the bore 35 by a plug 50 for holding the stem 47 against movement after manual rotation thereof for adjustment for orifice size. The end of the piston shaft and the stem structure adjusting lever 48 thereon is between the fork arms of the wheel W to be protected but to be accessible for adjustment of the valve structure. The outer end of the piston shaft extending through the bearing extension 31 has packing material 51 applied thereto by a gland 52, the packing tending to prevent leakage of hydraulic fluid outwardly along the shaft.

The hydraulic working chambers of the shock absorber structure must be kept filled with hydraulic fluid whether the shock absorber is in more or less vertical position during operation of the landing gear, or in horizontal or more or less inverted position when the landing gear is in its withdrawn or inoperative position. To accomplish this I provide replenishing structure comprising a replenishing chamber proper and a replenishing compensating chamber. Referring to Figure 3, the strut 10 is provided with a cross wall 53 which with the inner cross wall 21 of the shock absorber structure defines a cylindrical space within which operates a plunger or piston structure P. As shown, this structure may comprise an inner plate 54 and outer plates 55 between which cup washers 56 are clamped as by rivets 57, the cup washers being of leather or other suitable material. A compression spring 58 is interposed between the washer or piston structure and the wall 53, and the rivets 57 may have enlarged heads 59 to be surrounded by the spring so as to keep the spring axially aligned. Extending upwardly from the shock absorber inner wall 21 are a number of stop pins 60 which limit the outward movement of the washer structure P. The space between the washer structure and the wall 21 constitutes the compensating chamber proper C, while the space between the washer structure and the wall 53 constitutes the replenishing compensating chamber C'.

For controlling the flow of replenishing fluid from the chamber C to the shock absorber working chamber, check valves 61 are provided. In the wall 21, two valve chambers 62 are provided for the check valves, and ports 63 and 63' connect these valve chambers with the hydraulic working chambers 33 and 34' respectively, Figures 3, 4 and 6. Each valve 61 is shown in the form of a disk provided with an annular seating lip or flange 64 for seating against the bottom of the valve chamber 62 for closure of the corresponding port 63, the disk being notched or cut away outside of the seating lip to provide passageways 65 for the flow of fluid when the valve is unseated. A plug 66 is secured in the outer end of each valve chamber for seating a spring 67 abutting the valve to hold it normally closed, the plug having a fluid passageway 68 therethrough.

A filler plug 69 is provided for the replenishing chamber C, this plug being of any well known leak proof and pressure type so that hydraulic fluid may be forced therethrough under pressure into the chamber C. When such fluid is forced into the chamber C under pressure, the piston or washer structure P will be shifted outwardly against the resistance of the spring 58 and the fluid in the chamber C will then be under pressure at all times during the operation of the shock absorber structure. Any leakage from the hydraulic working chambers will be compensated for by fluid forced from the chamber C past the check valves 61, but whenever the fluid in the working chambers 33 or 34' is under pressure, the check valves 61 will be held closed by the pressure so that the working chamber fluid cannot be discharged into the compensating chamber C.

The replenishing compensating chamber C' does not receive fluid when the chamber C is charged with fluid under pressure, but the chamber C' is provided with an outlet 70 controlled by a check valve 71, through which outlet air may escape from the chamber C' while the chamber C is being filled with fluid. Any fluid or any air which may leak past the washer structure P into the chamber C' will therefore be expelled through the outlet 70 so that the structure P may properly function. Should fluid leakage from the shock absorber structure take place, the washer structure P will be moved inwardly by the spring 58 to compensate for the leakage and maintain the fluid pressure within the shock absorber, and when the structure P reaches the stop pins 60, the chamber will have to be given another charge of fluid. With the fluid in the chamber at all times under pressure, the hydraulic working chamber will be kept properly replenished and filled at all times independently of the position of the shock absorber, and the shock absorber will therefore always be ready for efficient operation when the landing gear is to be used.

I have shown a fluid intercepting channel 72 in the bearing wall 25 for the shock absorber piston shaft and a passageway for returning the intercepted leakage fluid through the reservoir or replenishing chamber C'. This passageway includes the passage 73 in the wall 25, the bore 27' of one of the pins 27, and the passage 74 through the corresponding partition wall 23'. Any fluid forced out along the piston shaft by the pressure within the working chamber is thus intercepted and returned to the replenishing chamber C.

I thus provide simple and efficient shock absorber structure and arrangement particularly adaptable for preventing shimmy or wobble of landing gear wheels without interfering with the efficient operation and functioning of the wheels, and with the shock absorber assembly concealed and protected but readily accessible for adjustment.

I do not desire to be limited to the exact construction, arrangement, and operation shown and described, as changes and modifications are possible which would still come within the scope of the invention.

I claim as follows:

1. An airplane supporting structure comprising a frame, a tubular strut supported on said frame for rotation on its longitudinal axis and terminating in a caster fork journalling a wheel, hydraulic shock absorbing structure above the fork and for which the end portion of said tubular strut provides a cylinder wall, cross walls in said cylinder wall defining therewith a cylindrical hydraulic working space, a piston shaft coaxial with said working space and journalled in said cross walls, a piston on said shaft within said working space, means connecting said shaft to said frame for holding said piston shaft against rotation whereby rotation of said strut with the caster fork will cause displacement of hydraulic fluid in said working space, and means resisting the flow of the displaced fluid whereby to dampen the caster fork movement to prevent shimmying thereof.

2. An airplane supporting structure comprising a frame, a rotatable tubular supporting strut mounted on said frame and terminating in a caster fork journalling a ground engaging wheel, the end of said tubular strut above said caster fork providing a hydraulic cylinder wall, cross walls in said cylinder wall defining therewith a hydraulic cylinder, a piston shaft coaxial with said cylinder and journalled in said cross walls, vanes on said shaft within said cylinder, said shaft projecting from the lower end of said strut, means connecting the projecting end of said shaft to said frame for holding the shaft against rotational movement whereby rotational movement of said strut with the caster fork will cause displacement of hydraulic fluid in said cylinder, and valve means for controlling the fluid flow for dampening of the caster movement whereby to prevent shimmying.

3. An airplane supporting structure comprising a frame, a cylinder supported on said frame for rotation on its axis, a caster fork secured to and extending downwardly from said cylinder and journalling a wheel, baffle walls extending radially inwardly in said cylinder, a shaft extending axially through said cylinder and having radial baffle walls extending therefrom between the baffle walls of the cylinder, means on said frame holding said shaft stationary whereby upon rotation of said cylinder with said caster fork hydraulic fluid in said cylinder will be displaced, and adjustable means for regulating the flow of the displaced fluid whereby to dampen the caster movement and prevent shimmying.

4. An airplane landing gear comprising a frame, a cylinder forming part of a rotatable strut mounted on said frame, a caster fork secured to and extending from the lower end of said cylinder and journaling a ground engaging wheel, baffle walls extending inwardly in said cylinder, a shaft coaxial with said cylinder and having radial baffle walls intermediate said cylinder baffle walls to define therewith hydraulic working chambers for containing hydraulic fluid, means on said frame holding said shaft against rotation with said cylinder, rotation of said caster fork and cylinder relative to said held shaft causing displacement of hydraulic fluid in said working chambers, and adjustable means for controlling the displacement flow to thereby dampen the rotation of said cylinder and caster fork and prevent shimmying.

5. An airplane landing gear comprising a frame, a rotatable tubular supporting strut on said frame terminating in a caster fork secured thereto and journalling a wheel, cross walls in the lower end of said strut defining with the surrounding tubular wall of the strut a hydraulic working space, baffle walls extending into said space from the tubular wall, a shaft extending through said cylinder space concentric therewith and having radial baffle walls intermediate the baffle wall of said tubular wall to define therewith hydraulic working chambers containing hydraulic fluid, means connecting said shaft to said frame for holding said shaft against rotary movement whereby upon rotary movement of said strut with said caster fork fluid in said working chambers will be displaced, and valve means for restricting the flow of the displaced fluid whereby to dampen the caster movement and prevent shimmying.

6. An airplane landing gear comprising a frame, a rotatable tubular supporting strut on said frame terminating in a caster fork secured thereto and journalling a wheel, cross walls in the lower end of said strut defining with the surrounding tubular wall of the strut a hydraulic working space, baffle walls extending into said space from the tubular walls, a shaft extending through said cylinder space concentric therewith and having radial baffle walls intermediate the baffle wall of said tubular wall to define therewith hydraulic working chambers containing hydraulic fluid, means connecting said shaft to said frame for holding said shaft against rotary movement whereby upon rotary movement of said strut with said caster fork fluid in said working chambers will be displaced, valve means for restricting the flow of the displaced fluid whereby to dampen the caster movement and prevent shimmying, a hydraulic reservoir chamber within said strut above said working chambers, check valve control passageways between said reservoir chamber and said working chambers, and a spring pressed plunger structure in said reservoir chamber operable to force fluid therefrom through said passageways to keep said working chambers filled at all times with hydraulic fluids.

7. An anti-shimmy arrangement for a castering wheel of a flying machine landing gear comprising, a strut which may be mounted, for rotation about its longitudinal axis, on the flying machine, an element adapted to carry a ground engaging wheel rigidly mounted on the lower end of said strut, a piston mounted within the lower end of said strut and having a rod upon which it is secured extending below the end of the strut, the walls of said strut forming a cylinder for said piston, means in said cylinder including a fluid adapted to cooperate with said piston, and means connected to said rod for holding said piston against rotation with respect to said flying machine whereby castering movement of said wheel is damped.

GERVASE M. MAGRUM.